United States Patent

Haraguchi

[11] Patent Number: 5,980,104
[45] Date of Patent: Nov. 9, 1999

[54] TEMPERATURE DISTRIBUTION MEASURING INSTRUMENT

[76] Inventor: Tatsuo Haraguchi, c/o Zexel Corporation Konan Plant, 39 Aza-Higashihara, Oaza-Sendai, Konan-machi, Osato-gun, Saitama, Japan, 360-01

[21] Appl. No.: 08/997,686

[22] Filed: Dec. 24, 1997

[30] Foreign Application Priority Data

Jan. 8, 1997 [JP] Japan .................................. 9-001250

[51] Int. Cl.⁶ .................................. G01J 5/08; G01J 5/62; G01K 3/06
[52] U.S. Cl. ........................... 374/124; 374/130; 250/332
[58] Field of Search .................................. 374/124, 130, 374/131, 137; 250/332, 338.3

[56] References Cited

U.S. PATENT DOCUMENTS

| | | | |
|---|---|---|---|
| 4,986,672 | 1/1991 | Beydon | 374/131 |
| 4,998,826 | 3/1991 | Wood et al. | 374/129 |
| 5,567,052 | 10/1996 | Yoshiike et al. | 374/130 |
| 5,660,471 | 8/1997 | Yoshiike et al. | 374/134 |
| 5,826,980 | 10/1998 | Kouzu et al. | 374/124 |

*Primary Examiner*—Vit Miska

[57] ABSTRACT

A temperature distribution measuring instrument comprises an outer cylinder having slits, an inner cylinder having a slit and a sensor array, arranged at the center of the cylinder, for detecting infrared rays passing through these slits. Each of the slits of the outer cylinder is changed in width according to its angle from a plane passing the center axis of the outer cylinder and the center of an object to be measured to equalize the measurement areas of the object and the rotation speed of the inner cylinder is changed to equalize the input times of infrared rays input from the object into the slits of the outer cylinder.

5 Claims, 8 Drawing Sheets

FIG.6 PRIOR ART
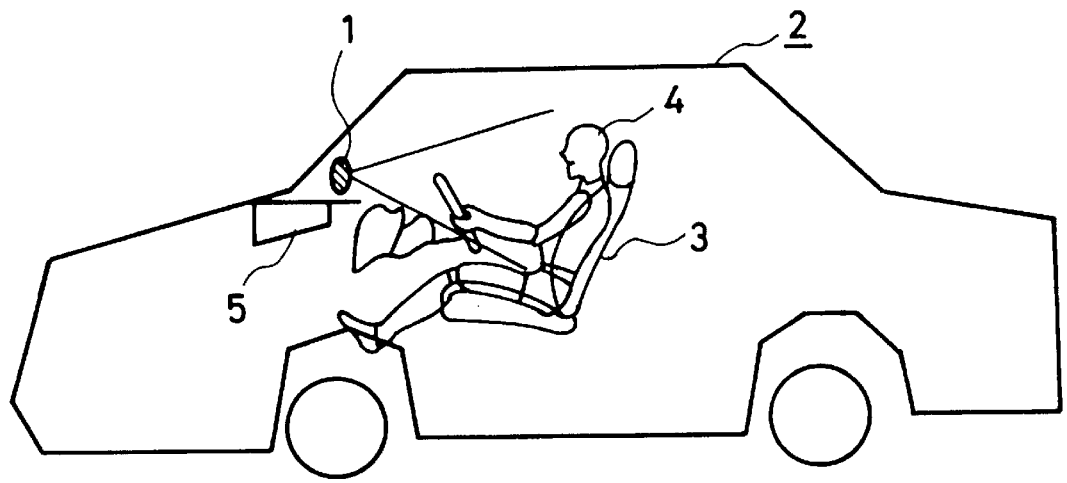
FIG.7(a) PRIOR ART        FIG.7(b) PRIOR ART
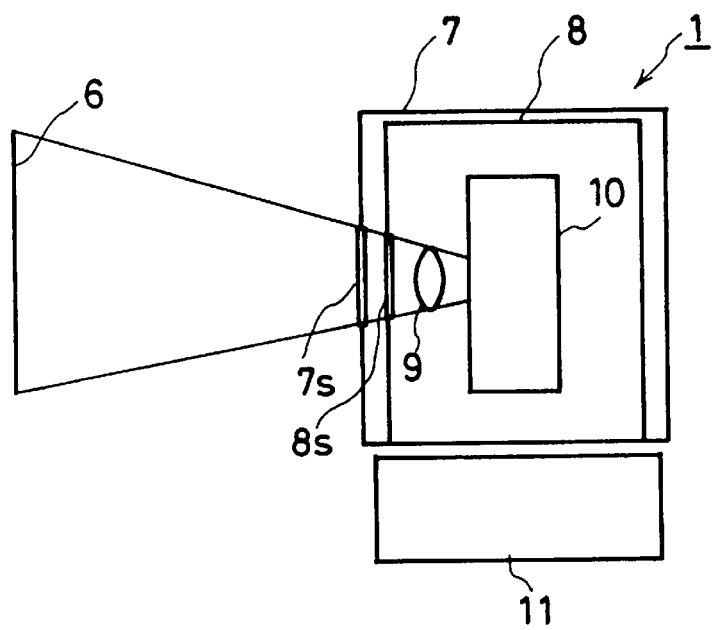 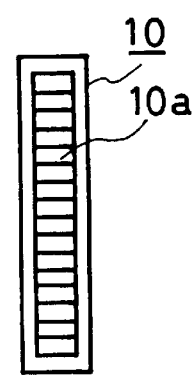

TEMPERATURE DISTRIBUTION MEASURING INSTRUMENT

BACKGROUND OF THE INVENTION

1. Field of the Invention

This invention relates to a temperature distribution measuring instrument for obtaining a thermal image of an object to be measured by detecting infrared rays from the object such as a human body. More specifically, it relates to a temperature distribution measuring instrument for use in the control of a car air conditioner or the like.

2. Description of the Prior Art

The Applicant proposes a temperature distribution measuring instrument for measuring a temperature distribution of a driver or passenger by detecting infrared rays from the driver or passenger, a seat and the like in a vehicle with incident light temperature sensors (to be referred to as "infrared sensors" hereinafter) in Japanese Laid-open Patent Application No. Hei-8-101671. This instrument comprises a sensor array consisting of infrared sensors arranged linearly inside an inner cylinder, an outer cylinder having a plurality of slits in its side portion, and the inner cylinder rotating inside the outer cylinder and having a slit in its side portion. It detects infrared rays radiated from the driver and the like in the vehicle, calculates temperature data based on the outputs of the infrared sensors of the sensor array and measures a temperature distribution in the vehicle. The slit in the rotating inner cylinder has a chopper function to transmit and cut off input infrared rays and the sensor array detects infrared rays from each part of the object passing through the slits in the outer cylinder along with the rotation of the inner cylinder as one column of a matrix sequentially to obtain a 2-D thermal image of the object. This temperature distribution measuring instrument is installed on top of the dashboard or therearound, back view mirror, room lamp, pillar or the like to detect a required area in the vehicle so that a temperature distribution mainly in an upper part including the thigh and portions therearound of the body of a driver seated in a driver's seat can be measured. FIG. 6 shows an example of the temperature distribution measuring instrument 1 which is installed on a portion near the top of a dashboard 5 almost in front of a driver 4 seated in a driver's seat 3 inside a vehicle 2.

As shown in FIG. 7(a), the temperature distribution measuring instrument 1 of the prior art comprises an outer cylinder 7 having a plurality of slits 7s, an inner cylinder 8 internal to the outer cylinder 7, having a slit 8s and sharing a center axis with the outer cylinder 7, a lens 9 for converging infrared rays radiated from the driver 4, driver's seat 3 and the like in the vehicle and input into the temperature distribution measuring instrument 1 through a slit 7s in the outer cylinder 7 and the slit 8s in the inner cylinder 8, a sensor array 10 for detecting the above input infrared rays, and inner cylinder drive means 11 for rotating the inner cylinder 8. The sensor array 10 is disposed at the center of the inner cylinder 8 and consists of a plurality of infrared sensors 10a arranged in parallel to the center axis of these cylinders as shown in FIG. 7(b).

FIGS. 8(a) and 8(b) are perspective views of the outer cylinder 7 and the inner cylinder 8, respectively. Out of infrared rays input from 16 slits 7s (701 to 716) in the outer cylinder 7, only infrared rays which are aligned with the slit 8s in the rotating inner cylinder 8 are input into the infrared sensor array 10. That is, when the inner cylinder 8 rotates clockwise as shown in FIG. 8(b), infrared rays passing through slit 701, slit 702, . . . and slit 716 in the outer cylinder 7 sequentially are input into the infrared sensor array 10 through the slit 8s in the inner cylinder 8 only for a time (input time) during which the slit 8s in the inner cylinder 8 is overlapped with the slit 7s in the outer cylinder 7. While the slit 8s in the inner cylinder 8 moves between slits 7s in the outer cylinder 7, infrared rays are cut off and not input into the infrared sensor array 10. Therefore, a thermal image measured by the temperature distribution measuring instrument 1 is obtained as a matrix consisting of a number of rows corresponding to the number of infrared sensors 10a (A to H) of the infrared sensor array 10 and a number of columns corresponding to the number of slits 7s in the outer cylinder 7, as shown in FIG. 9. In the figure, black columns between adjacent columns of the matrix indicate areas where temperature data are not obtained because infrared rays from the object 6 are cut off.

However, since the width L of each of the slits 7s in the outer cylinder 7 and the interval K between the slits 7s are fixed in the above prior art, as shown in FIG. 10, when the width W1 (to be referred to as "measurement width" hereinafter) of the object 6 radiating infrared rays to be input into the slits 7s in the outer cylinder 7 from the object 6 located in front of the temperature distribution measuring instrument 1 is L, the measurement width W2 of the object 6 through a slit which is located at an angle α from a plane passing the center axis of the cylinders and being perpendicular to the object 6 and which is in a portion away from the front side of the temperature distribution measuring instrument 1 is larger than L. Thus, W2 differs from W1. The product of the above measurement width and the length of each of the slits 7s in the outer cylinder 7 is called "measurement area" (to be exact, the area of the object radiating infrared rays to be input into the slit 8s in the inner cylinder 8). That is, temperature data on columns (1 to 8 and 9 to 16) of a thermal image are based on infrared rays input from different measurement areas. By changing the width of each column of a thermal image to a width proportional to the above measurement area, a thermal image can be expressed such that measurement areas farther from the center of the thermal image become larger, as shown in FIG. 11. Since the temperature data are essentially obtained from the quantity of radiated infrared rays per unit area, the measurement area of each column of the thermal image is larger as the angle from the above plane increases in the temperature distribution measuring instrument, thereby degrading measurement accuracy. As described above, as non-detected portions corresponding to the times during which the slit 8s in the inner cylinder 8 is shut are produced in the thermal image of the prior art, a continuous thermal image cannot be obtained.

SUMMARY OF THE INVENTION

The present invention has been made in view of the above problems of the prior art, and it is an object of the present invention to provide a temperature distribution measuring instrument which equalizes by a simple mechanism the measurement areas of the columns of a thermal image obtained by infrared sensors and is capable of obtaining a continuous thermal image.

According to a first aspect of the present invention, there is provided a temperature distribution measuring instrument which changes the width of each slit in an outer cylinder according to its angle from a plane passing the center axis of the outer cylinder and the center of an object to be measured to equalize the measurement areas of the object and changes the rotation speed of an inner cylinder to equalize the input times of infrared rays input from the object into the slits in the outer cylinder.

In this temperature distribution measuring instrument, since infrared rays from each part of the object are input into a plurality of slits in the outer cylinder and only infrared rays passing through a slit in the inner cylinder out of the above infrared rays are detected by an infrared sensor array of the temperature distribution measuring instrument, the measurement areas of the object mean the areas of the object radiating infrared rays to be input into the infrared sensor array.

According to a second aspect of the present invention, there is provided a temperature distribution measuring instrument, wherein the outer cylinder is rotatable and infrared rays from the object are measured at two positions by rotating the outer cylinder by an angle half the angle formed by adjacent slits in the outer cylinder.

According to a third aspect of the present invention, there is provided a temperature distribution measuring instrument, wherein two hooks are provided on the exterior side of the inner cylinder at an interval of 180°, one or two hooks are provided on the interior side of the outer cylinder at a predetermined angle to contact one of the above hooks when the inner cylinder rotates, and the outer cylinder is rotated reversely by an angle half the angle formed by adjacent slits in the outer cylinder each time the inner cylinder makes a half turn when the inner cylinder is rotated reversely each time it makes a half turn.

According to a fourth aspect of the present invention, there is provided a temperature distribution measuring instrument, wherein one or two hooks are provided on the exterior side of the inner cylinder, two hooks are provided on the interior side of the outer cylinder at a predetermined angle to contact the above hook when the inner cylinder rotates, and the outer cylinder is rotated reversely at an angle half the angle formed by adjacent slits in the outer cylinder each time the inner cylinder makes a half turn when the inner cylinder is rotated reversely each time it makes a half turn.

According to a fifth aspect of the present invention, there is provided a temperature distribution measuring instrument, wherein a hook is provided on a half portion of the entire outer peripheral surface of the inner cylinder, a hook connected to a spring is provided on the interior side of the outer cylinder, the inner cylinder is rotated when the hook on the inner cylinder contacts the hook on the outer cylinder to rotate the outer cylinder by an angle half the angle formed by adjacent slits in the outer cylinder, and the outer cylinder returns by the above angle after the inner cylinder makes a half turn.

The above and other objectives, features and advantages of the present invention will become more apparent from the following description when taken in conjunction with the accompanying drawings.

BRIEF DESCRIPTION OF THE ACCOMPANYING DRAWINGS

FIG. 6 is a diagram for explaining the arrangement of a temperature distribution measuring instrument of the prior art for use in a car air conditioner;

FIG. 7 is a diagram for explaining a temperature distribution measuring instrument of the prior art;

DETAILED DESCRIPTION OF THE PREFERRED EMBODIMENTS

Preferred embodiments of the present invention are described hereinafter with reference to the accompanying drawings.

In the following description, the same or corresponding elements as in the prior art are given the same reference symbols.

Embodiment 1

Figure 1A:
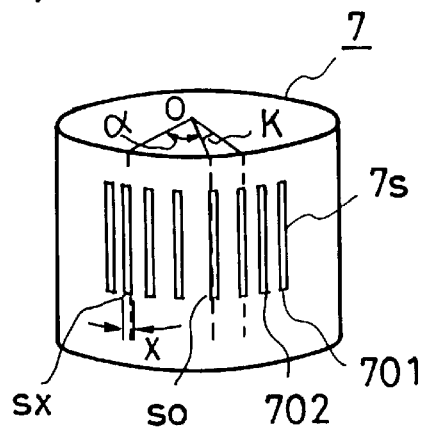
FIG. 1 is a diagram for explaining a temperature distribution measuring instrument according to Embodiment 1 of the present invention.
Figure 1B:
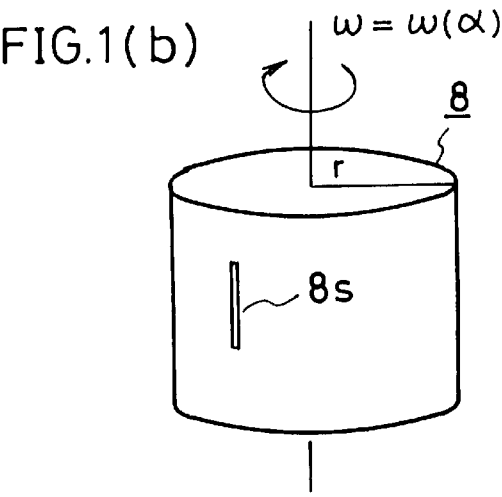
Figure 1C:
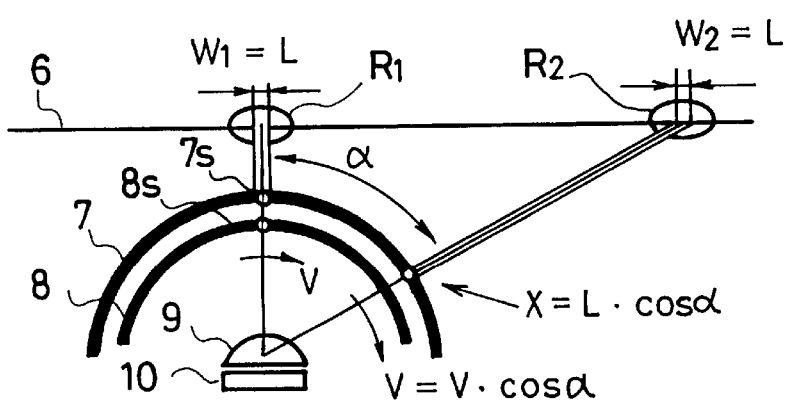

FIGS. 1(a) to 1(d) are diagrams for explaining Embodiment 1 of the present invention. FIG. 1(a) is a perspective view of an outer cylinder 7 having 16 slits 7s (701 to 716) parallel to the center axis of the outer cylinder 7 in its side portion. As described above, out of infrared rays input into the outer cylinder 7, only input rays which are aligned with a slit 8s formed in the side portion of a rotating inner cylinder 8 are input into an infrared sensor array 10 as shown in FIG. 1(b).

Figure 1D:
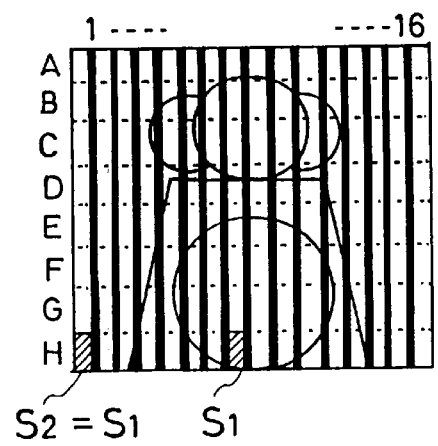

The interval K between adjacent slits 7s in the outer cylinder 7 is fixed and each of the slits 7s is changed in width according to its angle from a plane passing the center axis of the outer cylinder 7 and the center of an object to be measured 6 as follows. That is, the width "xo" of a slit "so" located directly in front of the center of the object 6 is set to L and the width "x" of a slit "sx" located at an angle α from the above plane is set to L·cosα. At this point, the width W1 (measurement width) of the object radiating infrared rays to be input into a slit 7s in the outer cylinder 7 from the object 6 located in front of the object 6 is equal to L and the measurement width W2 at an angle α from the above plane is equal to x/cosα=L as is obvious from FIG. 1(c). Therefore, since the measurement width W2 at an angle α from the above plane does not depend on the angle α and becomes a fixed value L, the measurement areas of the object 6 become the same irrespective of the location of a slit as shown in FIG. 1(d). However, the slit "so" located directly in front of the center of the object 6 is a slit located almost at the center of a slit block.

However, as described above, when the width of each slit is set as described above, the slits 7s in the outer cylinder 7 farther from the above plane become smaller in width. When the inner cylinder 8 is rotated at a fixed speed, infrared rays input into the sensor array 10 from slits farther from the above plane are input for a shorter time. As the shorter the input time of the infrared rays the smaller the outputs of the infrared sensors 10*a* becomes, the outputs of the infrared sensors 10*a* corresponding to the temperature of the object 6 cannot be obtained when the input time is very short. To equalize the input times of infrared rays from the slits 7*s*, that is, fix the chopping frequency of the infrared sensors 10*a*, the rotation speed v of the slit 8*s* in the inner cylinder 8 when it passes a position at the above angle α is changed to satisfy v=Vcosα to extend the input times of infrared rays into the sensor array 10 from slits far from the above plane. Thus, the input times of the infrared rays into the sensor array 10 passing through the slit 8*s* in the inner cylinder 8 from the slits 7*s* in the outer cylinder 7 can be equalized (V is the speed of the slit 8*s* in the inner cylinder 8 passing the above plane).

Thus, according to this embodiment, by changing the width of each of the slits 7*s* in the outer cylinder 7 and the rotation speed of the slit 8*s* in the inner cylinder 8, the measurement areas of the object 6 can be equalized and the chopping frequency can be fixed irrespective of measurement location. Therefore, the measurement accuracies of the center portion and side portion of the object 6 can be made the same. As a result, the measurement accuracy of the temperature distribution measuring instrument can be greatly improved.

Embodiment 2

Figure 2:
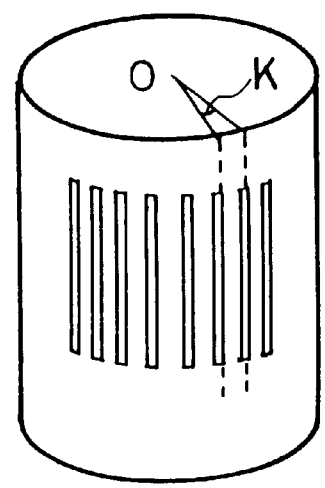
FIG. 2 is a diagram for explaining a temperature distribution measuring instrument according to Embodiment 2 of the present invention.
Figure 2:
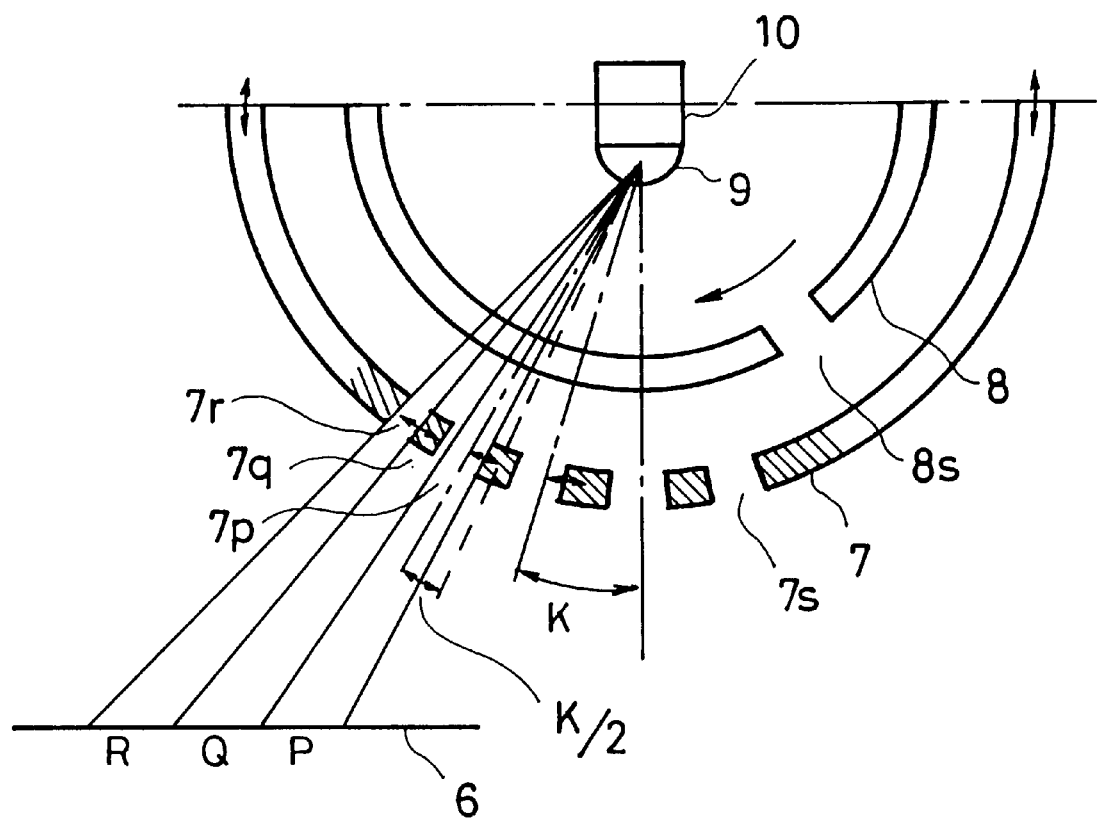

FIGS. 2(*a*) and 2(*b*) are diagrams for explaining Embodiment 2 of the present invention. The outer cylinder 7 of the temperature distribution measuring instrument 1 has 16 slits 7*s* (701 to 716) having an interval K and parallel to the center axis of the outer cylinder 7 in its side portion as shown in FIG. 2(*a*). As shown in FIG. 2(*b*), when a thermal image of the object 6 is to be measured, out of infrared rays radiated from continuous areas P, Q and R of the object 6, only infrared rays from the areas P and R pass through slits 7*p* and 7*r* in the outer cylinder 7 and reach the inner cylinder 8. When the slit 8*s* in the inner cylinder 8 is aligned with the slit 7*p* or 7*r* by the rotation of the inner cylinder 8, the above infrared rays are detected by the sensor array 10. On the other hand, since infrared rays from the area Q are cut off by a wall portion 7*q* of the outer cylinder 7 and do not reach the infrared sensor array 10, the area Q is a non-detection portion of a thermal image.

However, when a thermal image of the object 6 is measured by rotating the outer cylinder 7 by an angle half an angle K formed by adjacent slits 7*s* as shown by an arrow in FIG. 2(*b*), infrared rays from the areas P and R do not reach the infrared sensor array 10 and hence, the areas P and R become non-detection portions. On the other hand, infrared rays from the area Q which was a non-detection portion in the above measurement reach the infrared sensor array 10 and a thermal image of the area Q is detected.

The outer cylinder 7 is made rotatable, the inner cylinder 8 makes a turn to measure a thermal image M1 of the object 6, the outer cylinder 7 is then rotated by an angle K/2 to measure a thermal image M2 of the object 6 again, and the thermal image M1 and the thermal image M2 are synthesized, thereby removing non-detection portions of the thermal image of the object 6. After the measurement of the thermal image M2 of the object 6, the outer cylinder 7 is rotated reversely by an angle K/2 to return to its original position.

Thus, according to this embodiment, when two thermal images are measured by shifting the outer cylinder 7 by an angle half the angle K formed by adjacent slits in the outer cylinder 7, non-detection portions of the object 6 can be removed by synthesizing the two thermal images, thereby further improving the measurement accuracy of the thermal image of the object 6.

In the above embodiment, the thermal images M1 and M2 of the object 6 are measured each time the inner cylinder 8 makes a turn. The thermal images M1 and M2 may be measured by rotating the inner cylinder 8 by 180° C. and then reversely and rotating the outer cylinder 7 by the above angle K/2 each time the inner cylinder 8 completes a half turn. Alternatively, the thermal images M1 and M2 may be measured by forming two slits in the inner cylinder 8 at an interval of 180°, rotating the inner cylinder 8 in one direction and rotating the outer cylinder 7 by the above angle K/2 reversely each time the inner cylinder 8 makes a half turn.

Embodiment 3

FIGS. 3(*a*) to 3(*c*) are diagrams for explaining Embodiment 3 of the present invention. In Embodiment 3 of the present invention, the outer cylinder 7 is rotatable, hooks 12*a* and 12*b* are provided at different levels on the interior side of the outer cylinder 7 as shown in FIG. 3(*a*), and hooks 13*a* and 13*b* are provided at different levels on the exterior side of the inner cylinder 8 as shown in FIG. 3(*b*). As shown in the top view of FIG. 3(*c*), the hooks 13*a* and 13*b* are arranged at an interval of 180° on the inner cylinder 8, the hook 12*a* is located above the hook 13*a* and the hook 12*b* is located below the hook 13*b*. That is, the hooks of the inner cylinder 8 and the hooks of the outer cylinder 7 are arranged alternately in a circumferential direction. The inner cylinder 8 does not rotate in one direction but rotates reversely each time it makes a half turn.

A description is subsequently given of the operation of the above configured temperature distribution measuring instrument 1. From the state of FIG. 3(*c*), the inner cylinder 8 is rotated counterclockwise (direction b in FIG. 3(*c*)) to measure the thermal image M1 of the object 6. After the completion of the measurement, the hook 13*b* contacts the hook 12*a* at a position C1 of the figure before it rotates by 180° and pushes down the hook 12*a* to a position C2. At this point, the outer cylinder 7 is rotated counterclockwise (downward) by an angle half the angle K formed by adjacent slits 7*s*.

Thereafter, when the inner cylinder 8 begins to rotate reversely, that is, clockwise (direction a in FIG. 3(*c*)), since the slits 7*s* in the outer cylinder 7 rotate by an angle K/2, the temperature distribution measuring instrument 1 measures the thermal image M2 of the non-detection portions of the thermal image M1 obtained when the inner cylinder 8 rotated counterclockwise. After the measurement of the thermal image M2, the hook 13*a* contacts the hook 12*a* which has been rotated counterclockwise (downward) by the angle K/2 and is located at a position C2 before it completes a half turn, rotates the hook 12*a* clockwise (upward) by the angle K/2, and pushes up the hook 12*a* to a position C1. Therefore, the outer cylinder 7 is rotated clockwise (upward) by an angle half the angle K formed by adjacent slits 7*s* and returns to its original position. Thereafter, the inner cylinder 8 rotates reversely and a thermal image of the same position as the thermal image M1 obtained when the inner cylinder 8 rotates counterclockwise is measured.

According to this embodiment of the present invention, since two thermal images which are different by an angle half the angle K formed by adjacent slits in the outer cylinder 7 can be measured by simple hooks and the alternating rotation of the inner cylinder 8 without providing a dedicated drive unit on the outer cylinder 7, non-detection portions of the object 6 can be removed by synthesizing these thermal images.

Figure 3A:
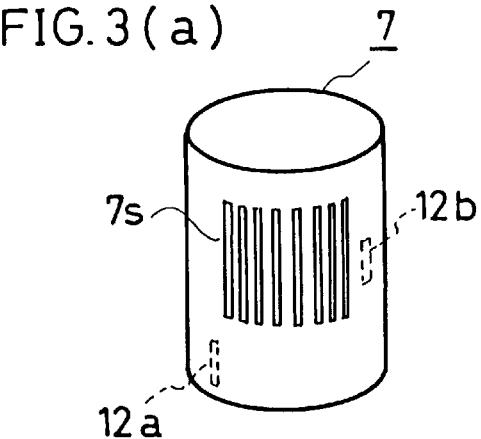
FIG. 3 is a diagram for explaining a temperature distribution measuring instrument according to Embodiment 3 of the present invention.
Figure 3B:
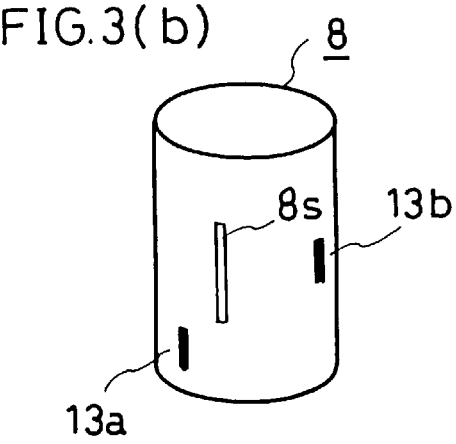
Figure 3C:
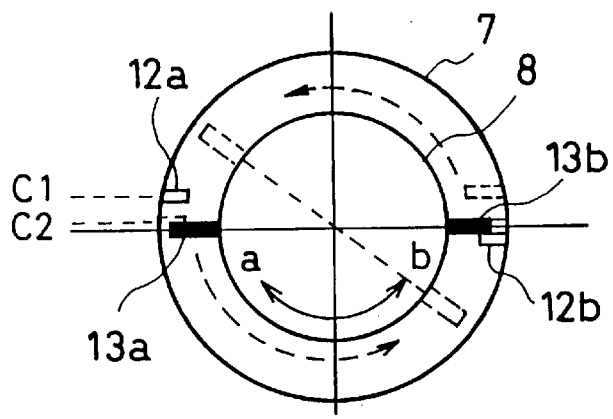
Figure 3D:
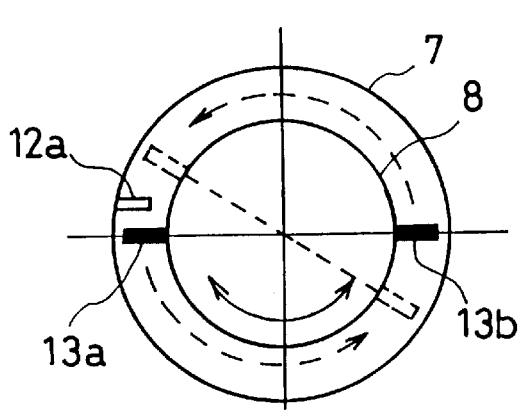

In the above embodiment, the hooks 12a and 12b provided at different levels on the interior side of the outer cylinder 7 to ensure the alternating rotation of the outer cylinder 7 by an angle half the angle K formed by adjacent slits in the outer cylinder 7. However, as shown in FIG. 3(d), either one of the hooks 12a and 12b may be provided on the outer cylinder 7.

Figure 3E:
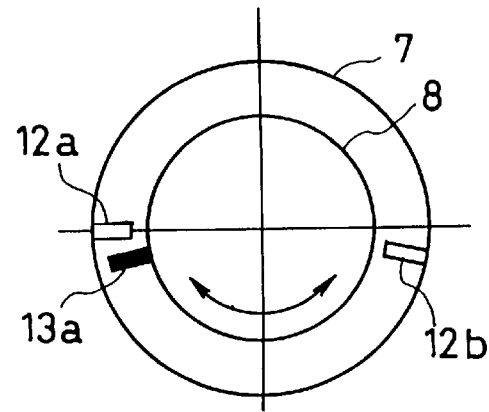
Figure 4A:
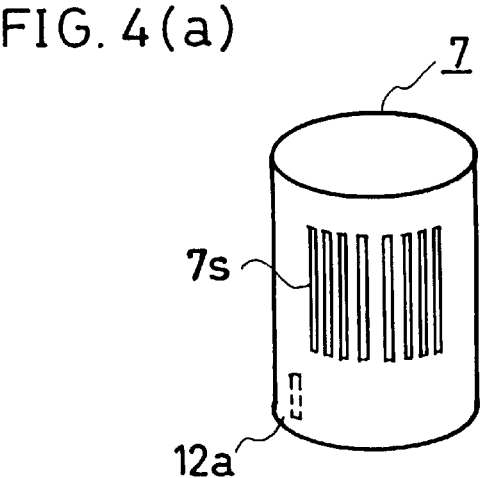
FIG. 4 is a diagram for explaining a temperature distribution measuring instrument according to Embodiment 4 of the present invention.
Figure 4B:
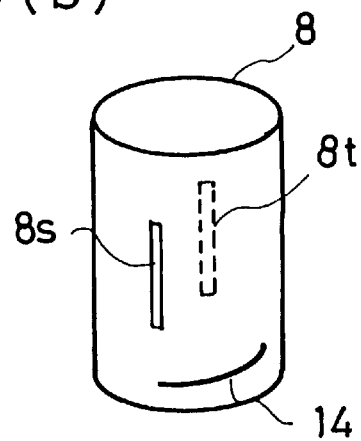
Figure 4C:
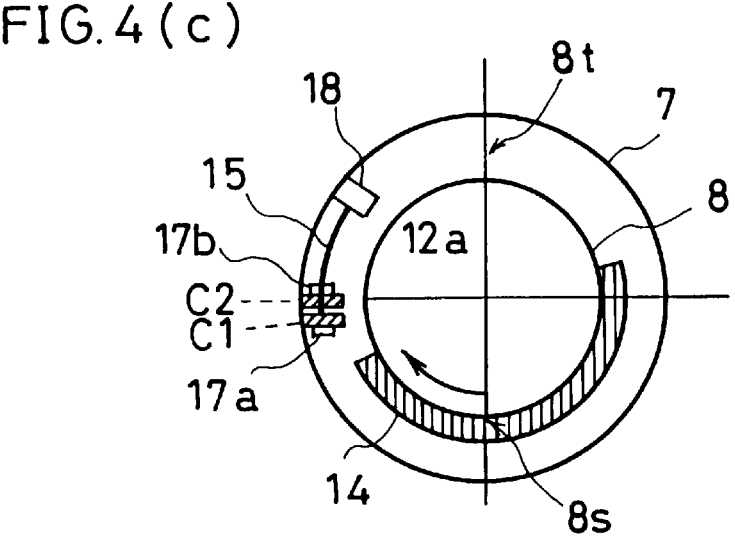
Figure 4D:
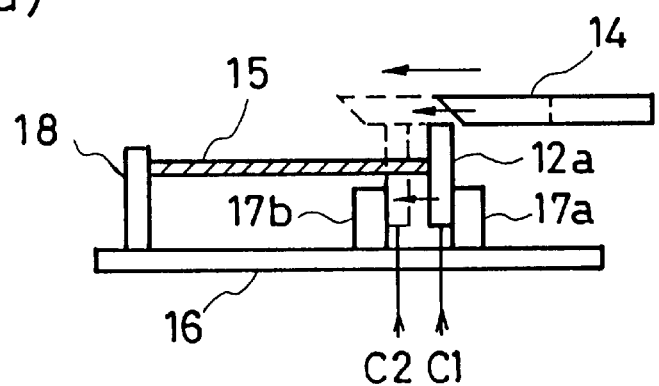

Alternatively, as shown in FIG. 3(e), the hooks may be provided on the outer cylinder 7 at an interval of a predetermined angle a little smaller than 180° and one hook may be provided on the inner cylinder 8. When the inner cylinder 8 is rotated reversely each time it makes a half turn and the outer cylinder 7 is rotated reversely by the angle K/2 each time the inner cylinder 8 makes a half turn, the same effect can be obtained.

Embodiment 4

FIG. 4 is a diagram for explaining Embodiment 4 of the present invention. The outer cylinder 7 is rotatable, and a hook 12a is provided on the interior side of the outer cylinder 7 as shown in FIG. 4(a). The inner cylinder 8 is rotated in one direction and two slits 8s and 8t having the same shape are formed in the side portion of the inner cylinder 8 at an interval of 180°, and a wedge-shaped hook 14 is provided on a half portion of the entire outer peripheral surface of the inner cylinder 8 so that it can contact the hook 12a as shown in FIG. 4(b). As shown in the top view of FIG. 4(c) and a partial side view of FIG. 4(d), when the hook 12a does not contact the hook 14, it is pressed against a stopper 17a provided on a base 16 of the temperature distribution measuring instrument 1 by a spring 15 and located at C1. The spring 15 is fixed to a spring stopper 18. When the inner cylinder 8 rotates and the hook 12a contacts the hook 14, the outer cylinder 7 rotates against the force of the spring 15 together with the inner cylinder 8 by friction between the hook 12a and the hook 14 and stops at a position C2 of a stopper 17b provided on the base 16. The interval between the stopper 17a and the stopper 17b is set such that the outer cylinder 7 rotates by an angle half the angle K formed by adjacent slits 7s.

When the inner cylinder 8 makes a half turn while the hook 12a is in contact with the hook 14, that is, the outer cylinder 7 is fixed at the above position C2, the temperature distribution measuring instrument 1 measures the thermal image M2 of the object 6 at the position C2 of the outer cylinder 7 through the slit 8s in the inner cylinder 8. When the inner cylinder 8 makes more than a half turn, the hook 12a does not contact the hook 14 and is returned by the spring 15, the outer cylinder 7 is thereby returned to the position C1, and the temperature distribution measuring instrument 1 measures the thermal image M1 of non-detection portions of the above thermal image M2 through the slit 8t by the following half turn.

According to this embodiment, two thermal images can be measured by shifting the outer cylinder 7 by the angle K/2 with simple hooks using a spring without providing a dedicated drive unit in the outer cylinder 7 and without rotating the inner cylinder 8 alternatingly. By synthesizing these thermal images, non-detection portions of the object 6 can be removed.

Figure 5A:
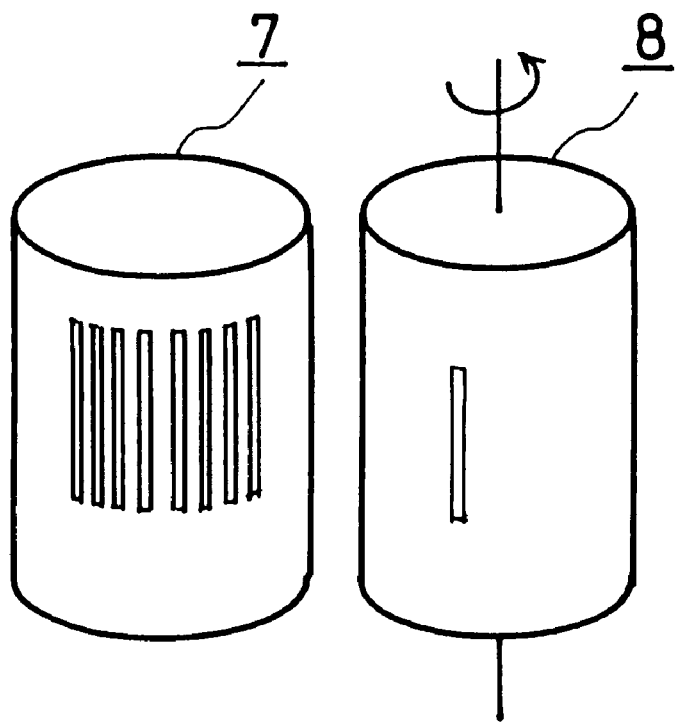
FIG. 5 is a diagram for explaining a combination of an outer cylinder and an inner cylinder of the temperature distribution measuring instrument of the above embodiments of the present invention.
Figure 5B:
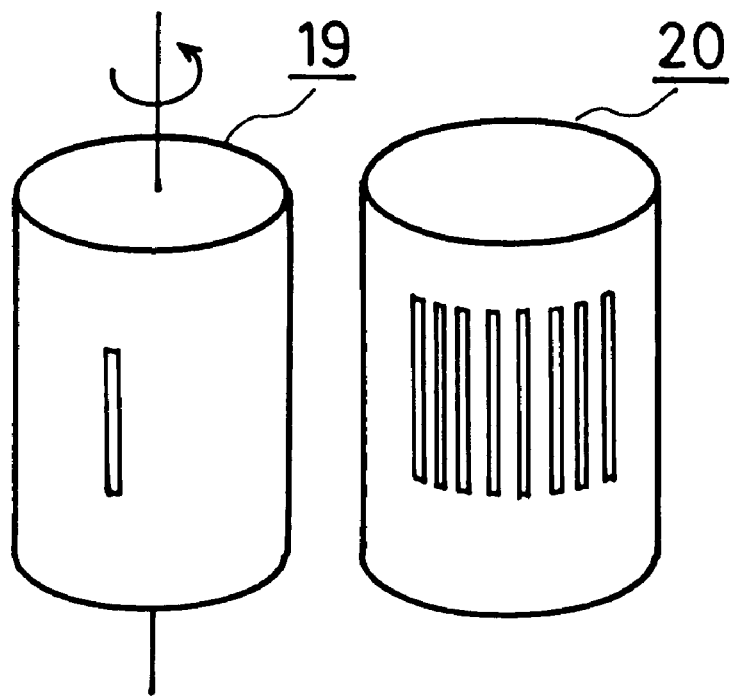
Figure 8A:
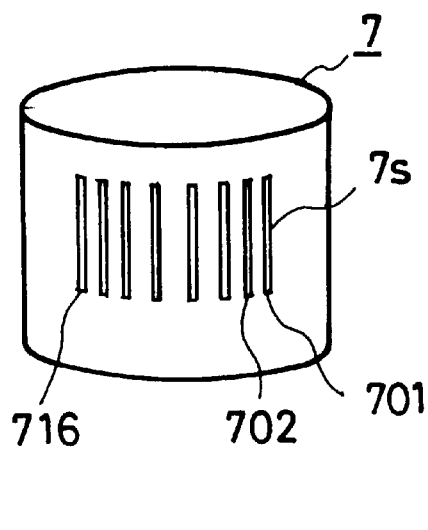
FIG. 8 is a perspective view of an inner cylinder and an outer cylinder of the temperature distribution measuring instrument of the prior art.
Figure 8B:
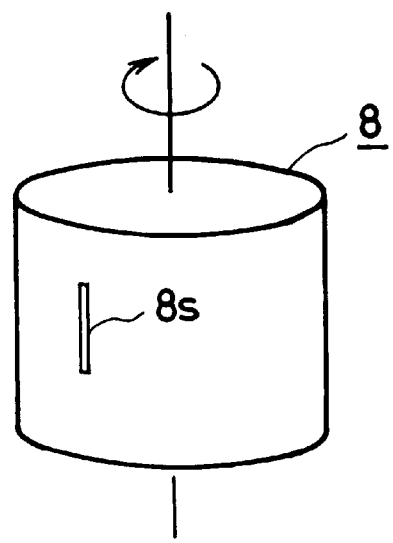
Figure 9:
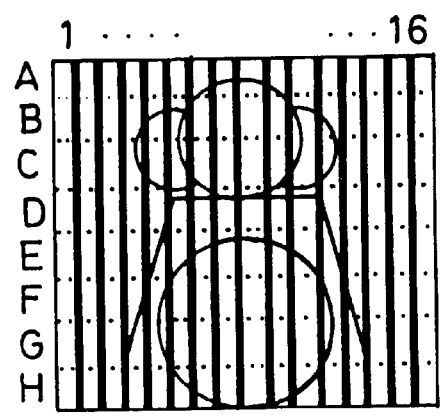
FIG. 9 is a diagram showing the configuration of a thermal image measured by the temperature distribution measuring instrument of the prior art.
Figure 10:
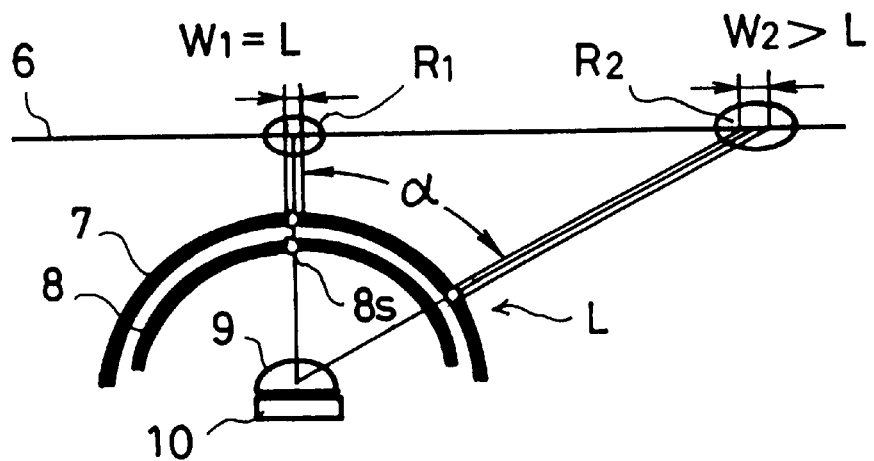
FIG. 10 is a diagram showing the measurement range of the temperature distribution measuring instrument of the prior art.
Figure 11:
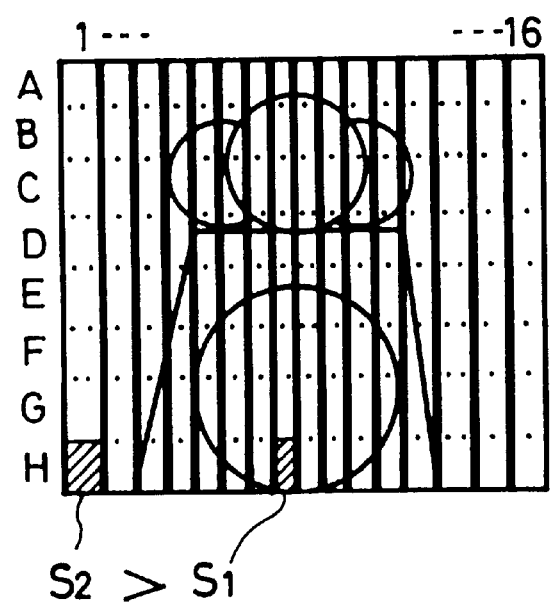
FIG. 11 is a diagram showing the relationship between the measurement range and the thermal image measured by the temperature distribution measuring instrument of the prior art.

In the above Embodiments 1 to 4, as shown in FIG. 5(a), a cylinder having a plurality of slits is used as the outer cylinder 7 and a cylinder having one or two slits is used as the inner cylinder 8. However, when a cylinder having one or two slits is used as an outer cylinder 19 and a cylinder having a plurality of slits is used as an inner cylinder 20 as shown in FIG. 5(b), the same effect as those of Embodiments 1 to 4 can be obtained.

As described above, according to the first aspect of the present invention, since each of the slits in the outer cylinder is changed in width according to its angle from a plane passing the center axis of the cylinders and the center of the object to equalize the measurement areas of the object and the rotation speed of the inner cylinder is changed to equalize the input times of infrared rays from the object into the slits, the measurement areas of the object become the same and the chopping frequency is fixed irrespective of the location of a slit in the outer cylinder. Therefore, the measurement accuracies of the center portion and side portion of the object can be made the same and the measurement accuracy of the temperature distribution measuring instrument can be thereby greatly improved.

According to the second aspect of the present invention, since the outer cylinder is rotatable and infrared rays from the object are measured at two positions by rotating the outer cylinder by an angle half the angle formed by adjacent slits in the outer cylinder, non-detection portions of the object can be removed and the measurement accuracy of a thermal image of the object can be further improved.

According to the third aspect of the present invention, since two hooks are provided on the exterior side of the inner cylinder at an interval of 180° and one or two hooks are provided on the interior side of the outer cylinder at a predetermined angle to contact one of the above hooks, and the outer cylinder is rotated reversely by an angle half the angle formed by adjacent slits each time the inner cylinder makes a half turn when the inner cylinder is rotated reversely each time it makes a half turn, non-detection portions of the object can be removed by simple hooks and the alternating rotation of the inner cylinder without providing a dedicated drive unit.

According to the fourth aspect of the present invention, since one or two hooks are provided on the inner cylinder and two hooks are provided on the interior side of the outer cylinder at a predetermined angle to contact the above hook when the inner cylinder rotates, and the outer cylinder is rotated reversely by an angle half the angle formed by adjacent slits each time the inner cylinder makes a half turn when the inner cylinder is rotated reversely each time it makes a half turn, non-detection portions of the object can be removed by simple hooks and the alternating rotation of the inner cylinder without providing a dedicated drive unit.

According to the fifth aspect of the present invention, since a hook is provided on a half portion of the entire outer peripheral surface of the inner cylinder, a hook connected to a spring is provided on the interior side of the outer cylinder, the hook on the inner cylinder and the hook on the outer cylinder contact each other to rotate the outer cylinder by an angle half the angle formed by adjacent slits when the inner cylinder is rotated and the outer cylinder is returned by the above angle when the inner cylinder makes a half turn, non-detection portions of the object can be removed by a simple mechanism without chaining the rotation direction of the inner cylinder.

What is claimed is:

1. A temperature distribution measuring instrument comprising:

an outer cylinder having a plurality of slits in its side portion;

an inner cylinder rotating inside the outer cylinder and having a slit in its side portion; and a sensor array consisting of infrared sensors arranged linearly inside the inner cylinder, wherein each of the slits in the outer cylinder is changed in width according to its angle from a plane passing the center axis of the outer cylinder and the center of an object to be measured to equalize the measurement areas of the object, and the rotation speed of the inner cylinder is changed to equalize the input times of infrared rays from the object into the slits.

2. A temperature distribution measuring instrument comprising:

an outer cylinder having a plurality of slits in its side portion;

an inner cylinder rotating inside the outer cylinder and having a slit in its side portion; and a sensor array consisting of infrared sensors arranged linearly inside the inner cylinder, wherein the outer cylinder is rotatable and infrared rays from an object to be measured are measured at two positions by rotating the outer cylinder by an angle half the angle formed by adjacent slits in the outer cylinder.

3. A temperature distribution measuring instrument according to claim 2, wherein two hooks are provided on the exterior side of the inner cylinder at an interval of 180°, one or two hooks are provided on the interior side of the outer cylinder at a predetermined angle to contact one of the above hooks when the inner cylinder rotates, and the outer cylinder is rotated reversely by an angle half the angle formed by adjacent slits in the outer cylinder each time the inner cylinder makes a half turn when the inner cylinder is rotated reversely each time it makes a half turn.

4. A temperature distribution measuring instrument according to claim 2, wherein one or two hooks are provided on the exterior side of the inner cylinder, two hooks are provided on the interior side of the outer cylinder at a predetermined angle to contact the above hook when the inner cylinder rotates, and the outer cylinder is rotated reversely at an angle half the angle formed by adjacent slits in the outer cylinder each time the inner cylinder makes a half turn when the inner cylinder is rotated reversely each time it makes a half turn.

5. A temperature distribution measuring instrument according to claim 2, wherein a hook is provided on a half portion of the entire outer peripheral surface of the inner cylinder, a hook connected to a spring is provided on the interior side of the outer cylinder, the inner cylinder is rotated when the hook on the inner cylinder contacts the hook on the outer cylinder to rotate the outer cylinder by an angle half the angle formed by adjacent slits in the outer cylinder, and the outer cylinder returns by the above angle after the inner cylinder makes a half turn.

* * * * *